United States Patent [19]

Elm et al.

[11] Patent Number: 5,167,010
[45] Date of Patent: Nov. 24, 1992

[54] EXPERT ADVICE DISPLAY PROCESSING SYSTEM

[75] Inventors: William C. Elm, Irwin; Emilie M. Roth, Pittsburgh; David D. Woods, Murrysville, all of Pa.

[73] Assignee: Westinghouse Electric Corp., Pittsburgh, Pa.

[21] Appl. No.: 389,386

[22] Filed: Aug. 3, 1989

[51] Int. Cl.⁵ .................................. G06F 15/48
[52] U.S. Cl. ........................... 395/50; 395/915
[58] Field of Search ........... 364/513, 188, 138, 900; 395/50, 915

[56] References Cited

U.S. PATENT DOCUMENTS

| | | | |
|---|---|---|---|
| 3,987,382 | 10/1976 | Cataldo et al. | |
| 4,001,807 | 1/1977 | Dallimonti | |
| 4,281,359 | 7/1981 | Bayer et al. | |
| 4,413,314 | 11/1983 | Slater et al. | 364/188 |
| 4,427,620 | 1/1984 | Cook | |
| 4,434,132 | 2/1984 | Cook | |
| 4,568,513 | 2/1986 | Book et al. | |
| 4,570,217 | 2/1986 | Allen et al. | 364/900 |
| 4,608,223 | 8/1986 | Twilley, Jr. | |
| 4,632,802 | 12/1986 | Herbst et al. | |
| 4,742,445 | 5/1988 | Watanabe | 364/188 |
| 4,745,543 | 5/1988 | Michener et al. | 364/181 |
| 4,749,985 | 6/1988 | Corsberg | |
| 4,752,889 | 6/1988 | Rappaport et al. | 364/188 |
| 4,803,040 | 2/1989 | Gross | 364/513 |
| 4,815,014 | 3/1989 | Lipner et al. | 364/188 |
| 4,817,092 | 3/1989 | Denny | 364/513 |
| 4,853,175 | 8/1989 | Book, Sr. | 364/138 |
| 4,860,204 | 8/1989 | Gendron et al. | 364/521 |
| 4,872,122 | 10/1989 | Altschuler et al. | 364/513 |
| 4,907,167 | 9/1990 | Skeirik | 364/513 |
| 4,979,137 | 12/1990 | Gerstenfeld et al. | 364/513 |

FOREIGN PATENT DOCUMENTS 1602544 5/1978 United Kingdom.

OTHER PUBLICATIONS

"Air Traffic Control: A Challenge for Artificial Intelligence", AI Expert, Jan. 1987.
"A General-Purpose Man-Machine Environment with Special Reference to Air Traffic Control" Findler et al., Int. J. Man-Machine Studies, 1985.
European Search Report completed Jun. 5, 1991 by Examiner Goetz P.A. at The Hague.
A Knowledge Based Consultant for Financial Marketing, Kastner, Apte, Griesner, Hong, Karnaugh, Mays, Tozawa, The AI Magazine, Winter 1986, pp. 71-79, see "Explanation, Advice, and Help" p. 76.
Edward R. Tufte, "The Visual Display of Quantitative Information" Graphics Press, Cheshire, Conn.
The Handbook of Artificial Intelligence, vol. II, Heuris Tech Press, Stanford, Calif.
Donald A. Waterman, "A Guide To Expert Systems" pp. 90-91, 102-103, Addison-Wesley Publishing Company.

(List continued on next page.)

*Primary Examiner*—Allen R. MacDonald
*Assistant Examiner*—George Davis

[57] ABSTRACT

The present invention provides expert advice produced by an expert system 16 as a graphic display that indicates to the user a range 64 in which an actual value 62 of a parameter should be kept for safe or efficient operation of the process being monitored. The operator adjusts control points to keep the actual value indicator 62 within the range 64. As the process being monitored moves toward an out-of-normal state, an alarm management system 18 reinforces the graphic advice with general and then more detailed alarm messages that are displayed in priority order in goal and process message slots 114–122. Recommendations, in the form of an action script, for particular actions, based on expert system action indications, are also presented as the system state becomes more unacceptable. The invention also displays an historical perspective of the process parameters being monitored and, through a prediction module 20, provides a prediction of the future state of the process and process parameters.

3 Claims, 6 Drawing Sheets

OTHER PUBLICATIONS

David D. Woods, "Visual Momentum: A Concept To Improve The Cognitive Coupling of Person And Computer", pp. 229-244.

L. P. Goodstein, "An Integrated Display Set For Process Operators" pp. 63-70.

R. H. Pope, "Power Station Control Room And Desk Design, Alarm System And Experience In The Use Of Cathode-Ray-Tube Displays" International Symposium on Nuclear Lower Plant Control Instrument 1978, vol. 1.

"DASS: A Decision Aid Integrating the Safety Parameter Display System and Emergency Functional Recovery Procedures" *Electric Power Research Institute.*

"Technical Note: Handling of Alarms Using Logic" *Nuclear Safety*, vol. 23, No. 5, Sep.-Oct. 1982.

P. J. Visuri, "Multivariate Alarm Handling and Display", National Technical Information Service, Springfield, V. 1982.

F. P. Lees, "Process Computer Alarm and Disturbance Analysis: Review of the State of the Art" *Computers and Chemical Engineering* vol. 7, #6, pp. 669-694, 1983.

EXPERT ADVICE DISPLAY PROCESSING SYSTEM

CROSS REFERENCES TO RELATED APPLICATIONS

This application is related to U.S. Pat. No. 4,816,208 entitled ALARM MANAGEMENT SYSTEM filed Jul. 14, 1986 which is incorporated by reference herein.

BACKGROUND OF THE INVENTION

The present invention is directed to a display processing system which presents advice produced by an expert system in a form particularly useful to the user and, more particularly, to a system which presents the expert advice in graphic form consistent with the graphic depiction of the process control data from which the expert advice is produced.

Within the field of Artificial Intelligence (AI), expert systems, and in particular rulebased expert systems, are becoming increasingly used in industry. These expert systems are normally constructed to emulate the behavior of an expert (or multiple experts) in a particular field, with respect to a particular problem. The intent is often described as attempting to "put Mr. X into a computerized box". These systems often incorporate one of several basic techniques, for example, using a forward chaining rule based system to fire a sequence of rules to arrive at a decision.

Expert systems have been developed for a variety of fields, but tend to share several very common characteristics. In general, expert systems reason based on data representing the world state, using an inferencing method chosen to emulate that of the expert in the field. The systems are intentionally partitioned to separate the knowledge of the state (the knowledge base) and the problem solving routines (the inference engine) which operate on that knowledge base. The intent is to determine an adequate solution to the problem with an accuracy approximating that of a human expert.

Users of expert systems have been found to be either reluctant or too trusting with regards to the advice which is produced by AI programs or modules. Users have been found to be much more comfortable with such a system when they are able to understand the basis for the advice being given. In fact, the acceptance of such a system in the workplace often is determined by the availability and quality of the basis for the advice. This is particularly evident at the knowledge bounds of the expert system, where the expert system is often described as "brittle", that is, where the advice is very likely to be inappropriate due to exceeding the original design scope of the system. It is classically difficult to detect when such an expert system is near its operating limits, and poor advice at those moments tends to reduce the system credibility overall. It is important for the quality of the person-machine interaction that the user be able to judge the soundness of the advice being given.

Current methods of presenting the output of expert systems are centered mainly on the textual output of advice. This advice is generally predefined sentences embedded into the rule structure, often with some variables inserted at output. If a user queries such a system on the reason that particular advice was presented, additional textual output is presented. The explanation or in other words the basis for the advice is typically generated and presented one of two ways: 1) The system developer has hardcoded explanatory information or text into the system. This makes the explanation very local in nature, it does not present an explanation of the overall state of the expert system, and it is linked to the one particular rules it was written to explain. If the text is more global in scope, it makes it difficult to improve or add to the system in a modular way, because "end point" explanations must then be changed each time an intermediate rule explanation is changed. 2) The system recites a history of the inference chain that arrived at the current advice, often in reverse order. This is helpful in tracing any chain of rule firings, and can dynamically reflect new rules when they fire, but it tends to sound much like a series of "Why? Because. Why? Because..." responses, often very unsatisfying to the user.

SUMMARY OF THE INVENTION

It is an object of the present invention to present advice in a form more useful to the user than a textual description of why an expert system rule has fired.

It is another object of the present invention to present the expert advice in a format that matches the presentation of the process parameters being monitored.

It is also an object of the present invention to present the expert advice in the context of an overall picture of the state of the process being monitored.

It is a further object of the present invention to provide expert advice in a graphic form.

It is still another object of the present invention to provide alarm messages along with the graphic advice to reinforce the graphic expert advice.

It is still another object of the present invention to provide advice on how to solve the problem associated with the advice being given.

It is an additional object of the present invention to provide an historical perspective as well as predictions of future process state along with the graphic expert advice.

The above objects can be accomplished by a system that provides expert advice in the form of a graphic display overlaid on a process data display to indicate the advice in the context of the process such as indicating to the user the range in which the parameter should be kept for safe or efficient operation of the process being monitored. This makes the present invention unique by determining these ranges from expert advice. Therefore, the expert's operations experience on each aspect of the process is depicted precisely at that place in the process display where it is the most relevant. The advice can also be generated and presented at various levels of abstraction simultaneously. The advice can also be presented across the full scope of the process (and its functional goals) simultaneously. It does not require the expert system to resolve the situation down to a single message. As the process being monitored moves toward an unacceptable, out-of-normal or less efficient state, the system reinforces the graphic advice with general and then more detailed alarm messages. Recommendations for particular actions are also presented as the system state becomes more unacceptable. The system also presents an historical perspective of the process parameters being monitored as well as provides a prediction of the future state of the process state and process parameters.

These together with other objects and advantages which will be subsequently apparent, reside in the details of construction and operation as more fully herein-

DESCRIPTION OF THE PREFERRED EMBODIMENTS

The present invention presents the expert advice directly on a process control graphic, in a format exactly matching the normal process data, supporting direct comparison and use of that advice. A textual outline or action script associated with the advice graphics is used to present a summary of the advice, and to convey temporal ordering of execution of operations designed to solve a problem recognized by the expert system. Expert advice about deviations from normal state, and reminders of departures from the presented expert advice are also presented in text, as, for example alarm messages, located adjacent to the respective parameter indications. This alarm type expert advice is presented in text to make it distinctive and discrete from the graphics, as it is used for "notification" that the user has chosen to deviate from the advice, or has in general gotten the process state into a region deemed improper by the embedded expert system. It is an interpretation of the data already visible in the process graphics/expert advice graphics display. The advice in general moves from a minimal appearance under normal conditions to more obvious advice, in larger amounts (alarm wordings and action scripts). The advice, rather than focusing on a limited set of process parameters, can be spread over the entire display hierarchy, which is organized to parallel the process system, providing expert advice appropriate at that level. Thus, when the user requires more detail about an issue, either process information or the related expert system advice, it is accessed by moving to a more detailed display in the hierarchy. This is in direct contrast to a query back through a chain of rule firings. Thus, the present invention is applicable to graphic display of the data presented to any expert system that allows construction of a network/hierarchy of dynamic graphic displays.

Figure 1:
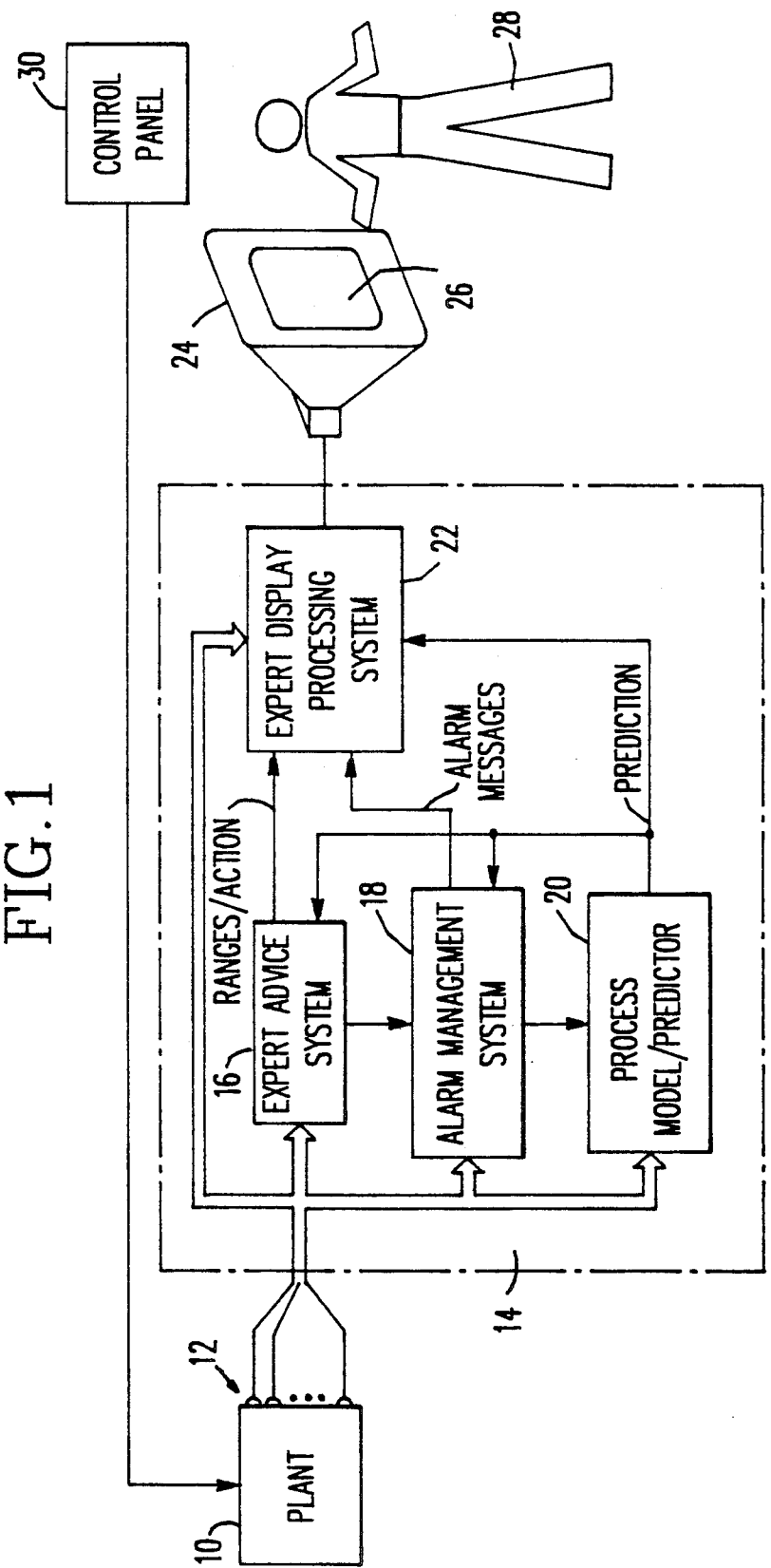
FIG. 1 illustrates the components of the present invention.

FIG. 1 depicts the equipment configuration and logical arrangement of the software modules used in the present invention. A plant 10 such as a nuclear power plant is monitored by various sensors 12 which send process state signals to a computer system 14. The computer system 14 includes an appropriate interface to convert the various sensor signals into digital representations of the parameters being monitored. From these actual process parameters, inferred or virtual process parameters can be determined.

The values of these actual and virtual process parameters are applied to an expert system software module 16 which produces expert advice and conclusions about the state of the plant process being monitored. The expert advice or output of the expert system 16 used by the present invention is a parameter range in which the parameter being monitored should be kept for normal or safe operation of the process. The Intelligent Manual Feedwater Control System Expert System available from Westinghouse will provide an appropriate range output for parameters being monitored by this expert system 16. It is also possible for those of ordinary skill in the art of expert system design to modify a particular expert system, so that it will output the expert advice for process control in the form of a recommended range of parameter values.

The expert system 16 also can compare the actual parameter value, produced by the sensors 12, to the recommended operating range produced by the expert system and indicate to an alarm management system 18 that an out of range alarm message for this particular parameter should be produced. This alarm management system 18 would take this abnormality indication and produce appropriate alarm messages. However, it is preferable that the range values be provided by the expert system 16 to the alarm management system 18 and that the alarm management system make the out of range comparison and generate the appropriate message. A suitable alarm management system is described in U.S. Pat. No. 4,816,208 incorporated by reference herein.

The expert advice system 16 also determines appropriate actions which can be taken to bring the particular parameters being monitored back to normal or more efficient value. These action indicators can also be output to the alarm management system 18, so that appropriately worded action script messages can be produced. However, it is preferable that the expert system produce the action script messages.

The parameter values obtained by the sensors 12 are also provided to a process model/predictor software module 20 which examines the process being controlled using a model which will predict the future state of the process. These prediction outputs are also provided to the alarm management system 18 which will produce an appropriate alarm message. The prediction related messages are produced by comparing the safe or efficient range for a parameter produced by the expert system 16 with the prediction values produced by the system 16 and by comparing to prediction with fixed thresholds for events such as a reactor trip. The process/model predictor 20 functions as an expert prediction system. Such modules 20 are commonly available and one suitable for nuclear power plant prediction can be obtained from Westinghouse and is called COSMOST ™.

An expert display processing system software module 22 receives the actual and virtual parameter values, the range values, the action indicators, the action messages, the alarm messages and the prediction data, and creates a display 26 for a display device 24. This display 26 includes the graphic expert advice and action messages along with the alarm messages and the prediction data representation. An operator 28 viewing the display 26 can then actuate various devices in the plant 10 through a control panel 30 which will cause the various parameters being monitored to change. The operator has the opportunity to follow or ignore the expert advice and can immediately understand the reasoning behind the advice and the impact of ignoring the advice. The operator 28 can also change the expert advice display screen to display expert advice for various levels in the hierarchy of the plant, so that the operator 28 can explore the basis for the originally presented expert advice. The graphic display of the expert advice is presented along with the normal process control parameter data as illustrated in FIG. 2.

Figure 2:
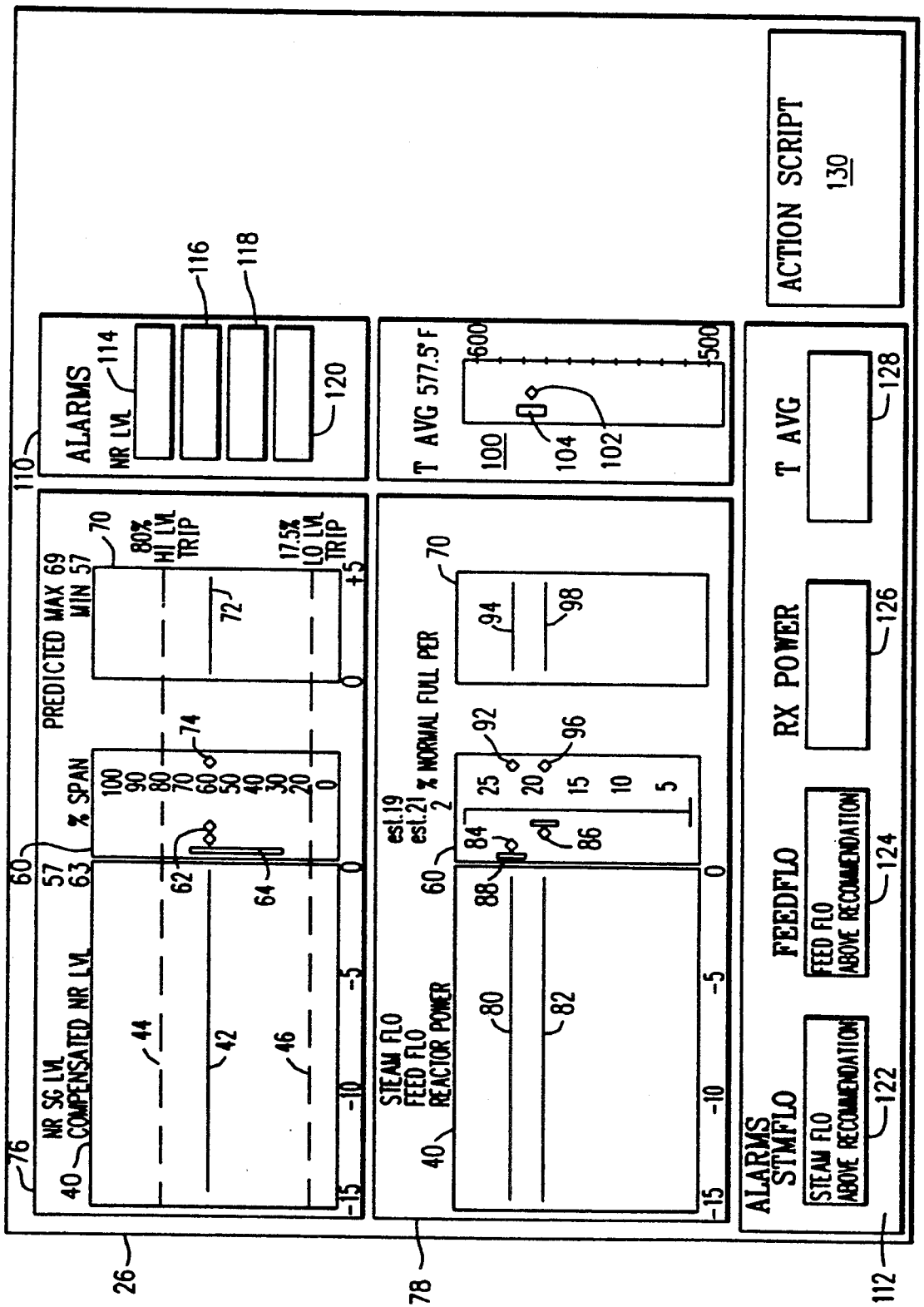
FIG. 2 depicts the displays in accordance with the present invention when a process is operating normally in a steady state.

FIG. 2 illustrates a steady state system in which the process being monitored is operating well within the desired region. The display 26 is divided into several major portions. The first is a historical display section 40 which displays the history of the process control parameters being monitored using a graphic representation 42 of the values of the parameters that have occurred in the past. As can be seen from the timeline indications at the bottom of the historical section 40, the time progresses into the past from the present time (i.e. time 0). This section 40 of the display also shows the relationship between the actual value line 42 and thresholds 44 and 46 at which an automatic activity or event such as a plant trip will occur. Adjacent to the historical display 40 is a current value display section 60 which has indicators 62 which display the current values of two of the parameters being monitored, in this case steam generator level and compensated level. The actual value indicators 62 indicate the present value of the process parameters being monitored. Adjacent to the current value indicator 62 is a range indicator 64 which is the graphic representation of the range type expert advice being given by the expert advice system 16. In response to this display and to changes in the relationship between value indicators 62 and the range indicator 64, the operator 28 changes controllable units in the plant 10 in such a way as to keep the actual value indicators 62 within the advice range 64 or goals of the system. In the present situation the operator would open and close the main feedwater valve to affect appropriate changes. This action by the operator 28 is similar to the actions in well known video games in which the player must follow a moving object by actuating joy stick type control mechanisms.

Adjacent to the current value section 60 is a future or prediction display section 70 which includes a forward looking prediction plot line 72 which indicates the most likely future state of the parameters being monitored. The prediction values for this line 72 are produced by the model predictor 20. Adjacent to the line 72 is a pair of indicators 74, although only one is shown in this picture, which indicates the maximum and minimum values of the prediction over the predicted interval into the future.

The top level display 76 is related to the goals of the system being monitored while a second section of the display 78 is related to the particular processes which are used to accomplish the goals represented. A detailed discussion of the goals, processes and requirements methodology for functionally dividing a process control system into levels of abstraction and displaying information appropriate to the levels can be found in U.S. Pat. No. 4,816,208.

The processes display 78 depicts two parameters being monitored that have different values and as an a result different history lines 80 and 82 and different actual value indicators 84 and 86. The expert graphic advice, for each of these parameters, in the form of operating ranges 88 and 90, is depicted separately to indicate the separate expert advice about control of each parameter. This display also shows the maximum/minimum indicators 92, prediction line 94, maximum/minimum indicators 96 and prediction line 98 associated with each monitored parameter.

The display 26 also includes a window 100 which displays a parameter, such as the average feedwater temperature, using an actual value indicator 102 and an expert advice range graphic 104 indicating the range in which the average temperature should be kept. This display window 100 does not provide a history or prediction associated with the average temperature due to the specific nature of this particular process (the history is not relevant to the control of this process).

The display 26 also includes a goal alarm section 110 and a process alarm section 112. Each of these sections includes message slots 114-128 in which variable wording messages associated with the function or process being monitored are displayed. As previously discussed, the alarm management system described in U.S. Pat. No. 4,816,208 provides the appropriate messages that are displayed in these slots.

The display 26 also includes an action script portion 130 which displays the recommended actions to be taken that are produced as action indications by the expert advice system 16 or as messages by system 18. This action script provides the operator with temporal expert advice about a particular parameter that needs to be manipulated. This explicit advice is provided because the identity of parameter to be manipulated is not explicitly conveyed in the graphics. The order to do something particular is explicitly written here to make sure the operator adjusts the correct parameter.

Figure 3:
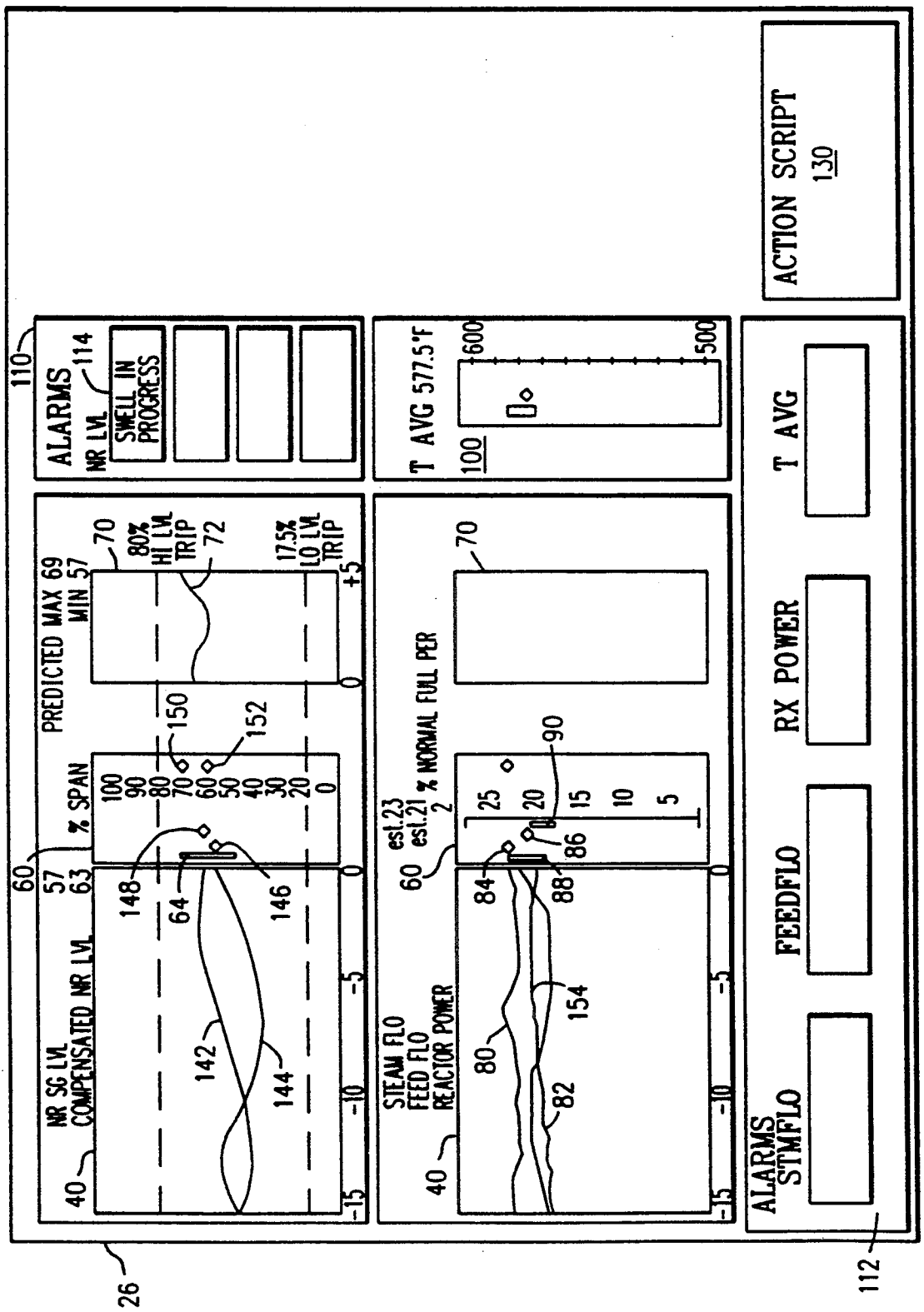
FIG. 3 depicts the displays of the process depicted in FIG. 2 as the process moves away from a normal condition.

FIG. 3 depicts a display in accordance with the present invention in which the parameters being monitored in FIG. 2 have undergone changes. The history portion 40 shows that the two parameters being monitored have diverged and produced two separate curves 142 and 144. The actual value indicators 146 and 148 have also separated for the current value. As can be seen by comparing the expert advice dynamic range graphic 64 of FIGS. 2 and 3, the range of recommended normal operation has contracted because of the changes in the plant 10 which requires the operator to maintain the values within a smaller operating range for normal or safe operation. As can be seen by this comparison, the expert advice in the form of the recommended operating range 64 is dynamic and changes as the expert advice changes.

The prediction curve 72 in section 70 also indicates future changes in the system state and as a result the minimum and maximum value indicators 74 have separated to produce two indicators 150 and 152. Because the expert system 16 and/or alarm management system 18 have recognized that a swell is in progress in the steam generator, the goal alarm section 110 includes an appropriate message in the highest slot 114. Because the swell does not produce additional alarms with respect to the processes being monitored, the process alarm section 112 includes no alarm messages.

Because the expert system does not recommend that any particular action be taken, the action script portion 130 of FIG. 3 does not include any action recommendations. The dynamic nature of the recommendations is also illustrated by the ranges 88 and 90 depicted in the process monitoring portion 78 of the display 26. As can be seen, the expert advice graphic recommendation ranges 88 and 90 have moved in relation to the depiction in FIG. 2 and changed in size. This reflects graphically the expert system advice on new recommended values for these parameters. The operator should (if desiring to follow the advice) manipulate the process to achieve these new values. The actual value indicator 86 is shown outside of the recommended range signaling to the operator that, for example, the feedflow or steam flow should be decreased In other words, the operator is asked to change the controllable system parameters in such a way as to move the actual values back into the recommended range. As can be seen from FIGS. 2 and 3 the system, through the recommended advice graphics, is asking the operator to play a simple game of follow the moving object. By presenting the advice in such a graphic mode and providing instructions to the operator that the actual value indicators should be kept within the ranges displayed, the present invention takes advantage of the skills of anticipating and following a moving object that are evident in responses to electronic video games.

FIG. 3 also illustrates that a parameter can be followed for historical purposes, such as illustrated by the line 154, without providing expert advice or an actual value for that parameter. The provision of extra parameter curves on the process display 78 allows the operator to follow additional parameters which indicate to the operator the state of other parts of the system. As a result, the operator can obtain an overall picture of the system while monitoring particular parameters. FIG. 3 also illustrates a situation where a prediction associated with the processes in the process section 78 is not being made by the system 20.

Figure 4:
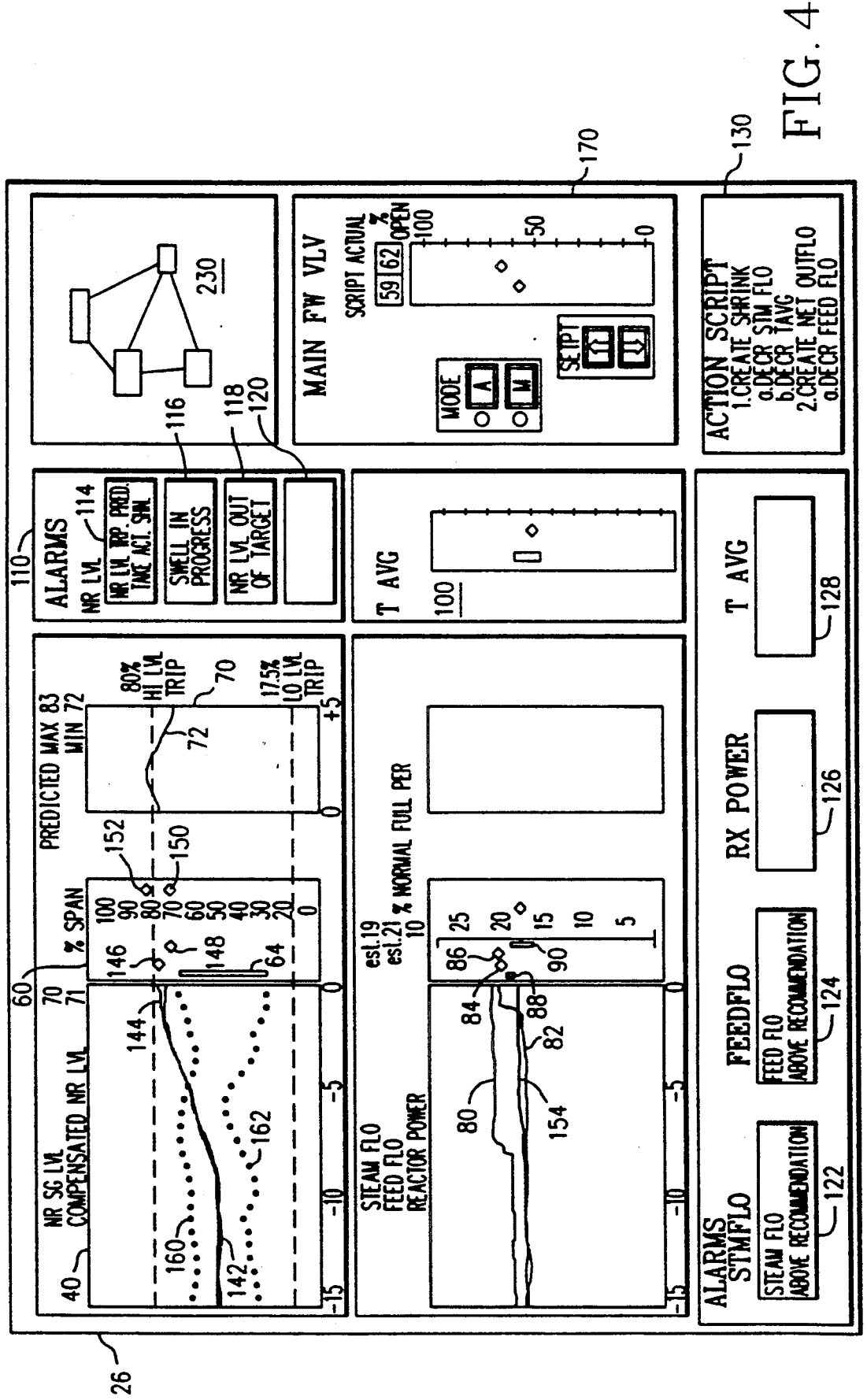
FIG. 4 depicts the process of FIGS. 2 and 3 in a more out-of-normal state.

FIG. 4 illustrates a further change in the system being monitored such that the actual value indicators 146 and 148 are outside the expert recommended range 64. This display also indicates that the reactor is likely to trip as illustrated by the prediction curve 72 passing above the high level trip threshold in the prediction section 70. As can be seen from this figure the recommended advice ranges 64, 88 and 90 have again changed in location and size, and the relationship of the actual parameter values 146, 148, 84 and 86 have also changed with respect to the recommended advice graphic ranges 64, 88 and 90. Because the system has proceeded into a more precarious state, additional alarm messages have now appeared in the goal alarm section 110 and messages have appeared in the process alarm section 112. The system has also generated an action script in 130. The alarm message in the alarm slot 114 has been produced because the prediction module 20 has predicted a trip and informed the alarm management system module 18 which has produced the appropriate message. This section 110 also illustrates that the alarm management system 18 sorts the alarms according to importance or priority. The alarm messages, initiated by the system 18 detecting an out of range condition, appear in the appropriate slots 122 and 124. This display also provides recommended actions in the action script section 130 which the operator should take to correct the problem. The appearance of the action script indicates that the expert system 16 thinks the process has reached a stage where a particular intervention in a particular order is necessary to avoid or correct a critical problem. This action script is produced by the expert advice system 16 and dynamically varies in accordance with the particular system state.

FIG. 4 also illustrates that the history of the expert advice being presented by the expert system 16 can also be shown on the display 26 as illustrated by the dotted lines 160 and 162. In some systems which have computer generated and operator actuated interfaces, the terminal or display screen on which data is presented can also act as the control points for the system being monitored. The present invention can include such a control section 170 which allows the operator to control the controllable units associated with the parameters being monitored immediately adjacent to the display of the actual values and expert advice.

Figure 5:
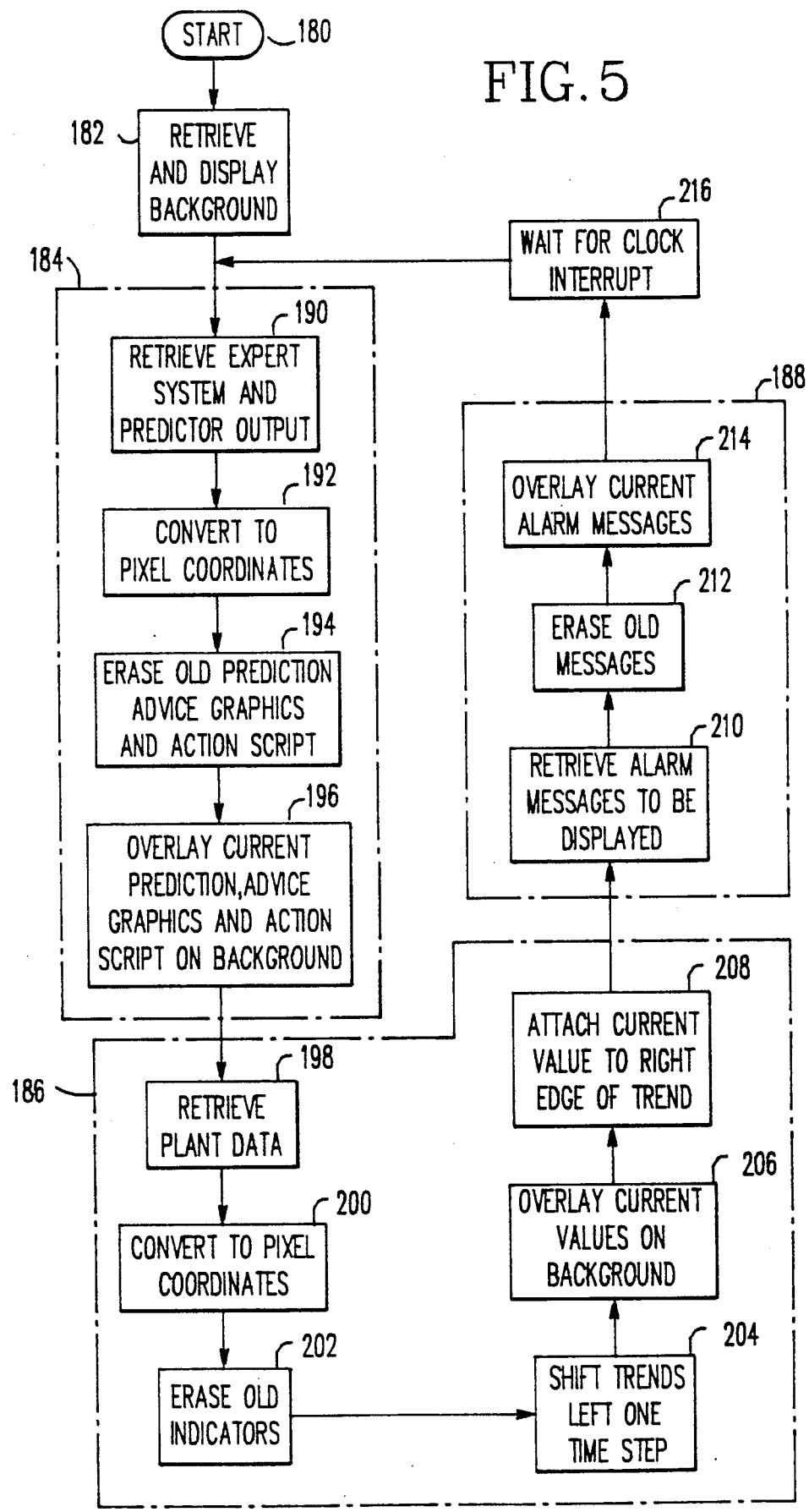
FIG. 5 is a flow chart of the process performed by the expert display processing system 22 illustrated in FIG. 1 for the displays illustrated in FIGS. 2-4.

The expert display processing system 22 depicted in FIG. 1 executes a process as illustrated in FIG. 5 to produce the displays of FIGS. 2-4. First, the system module 22 retrieves and displays 182, on display device 24, the background which includes all of the information on the screen which does not change. Once the background display is produced the system executes three processes 184-188 during which the system produces the expert graphic overlay (184), displays the actual values and updates the history (186) and displays the alarms (188).

The processing to produce the expert advice graphic and the action script begins with retrieving 190 the expert system output in the form of the high and low values of the ranges and the indicators or messages of the actions to be taken. The range values are then converted 192 into pixel coordinates for display. The old advice graphics and action script are erased 194 and the new advice graphics and action script are overlayed 196 on the background.

To produce the actual value indicators and the history trend first the actual plant data or parameter values are retrieved 198 and converted 200 into pixel coordinates for the location of the current value indicators. The old current value indicators are then erased 202 and the trend or historic information is shifted 204 left one time step. Then the indicators for current values are overlayed on the background and the current value is attached 208 to the right edge of the trend line.

Next the alarm message processing is performed by retrieving 210 the alarm messages to be displayed. The alarm messages will include a slot number which indicates into which slot in the display the particular alarm message should be written. The old messages are then erased 212 followed by an overlay of the current alarm messages on the background 214.

Once this cycle of display update has been completed the system waits 216 for a clock interrupt during which new process parameter data is gathered, analyzed for predictions and alarms.

Figure 6:
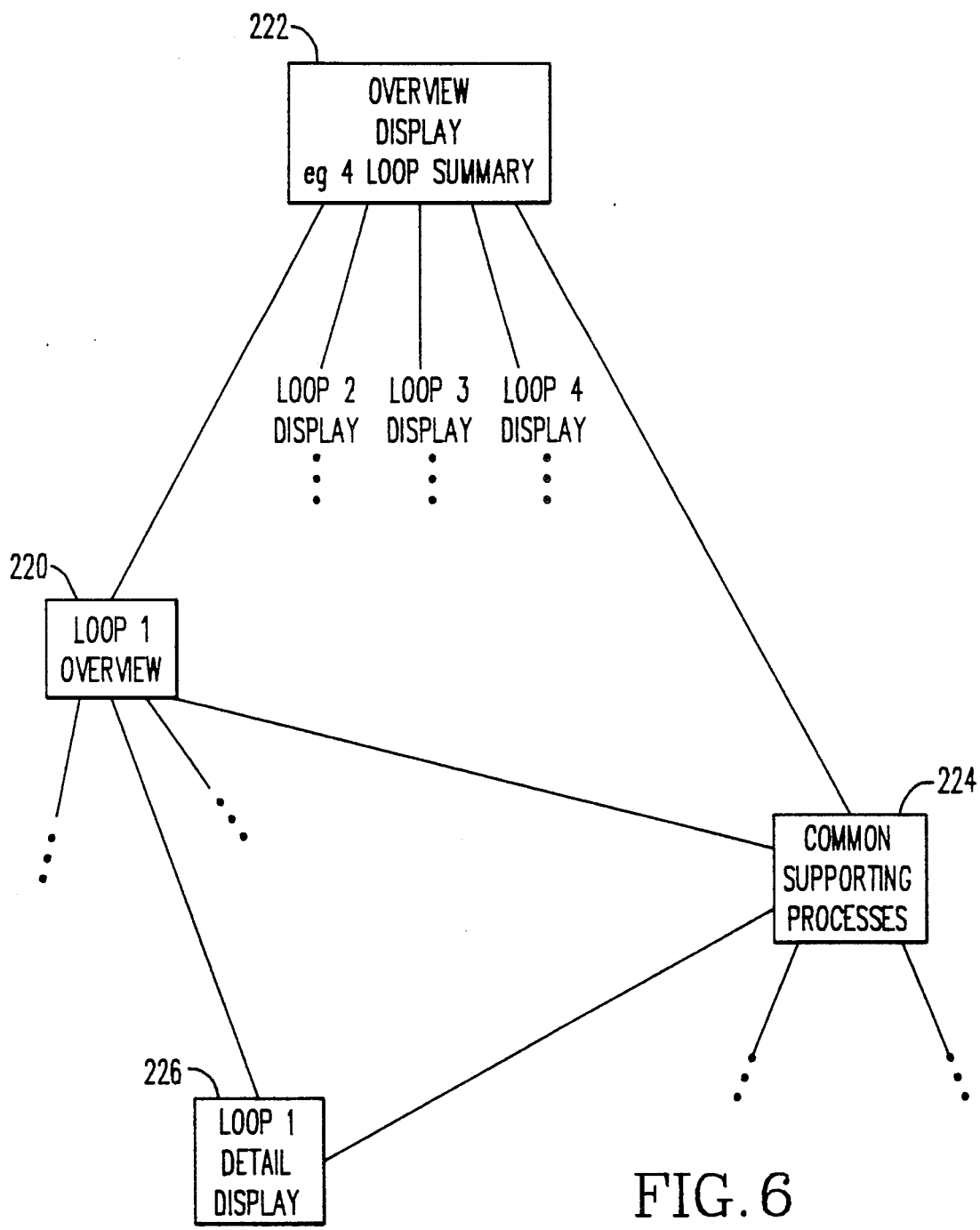
FIG. 6 illustrates how the present invention can be used in the context of a complex system to provide various levels of hierarchial display detail and advice.

The displays illustrated in FIGS. 2-4 and produced by a system as in FIG. 1 should be organized in hierarchy along system functional lines as illustrated in FIG. 6. By organizing the displays in a functional hierarchy, the operator can investigate the reasons behind the expert advice by moving among expert advice displays in a functional relationship that mirrors the functional operation of the problem domain rather than by traversing a chain of rule firings, as is necessary in the prior art. The displays illustrated in FIGS. 2-4 for a nuclear power plant are represented by the loop 1 overview 220 in the hierarchy of FIG. 6. The loop 1 overview display will provide advice about the loop 1 state and the process condition of loop 1. The operator, because of the goal, process and requirement hierarchy of displays, can move to an overview display 222 which provides a summary of the various loops in the nuclear power plant steam generator. This overview display will provide advice about overall goal achievement, loop balance, loop to loop comparisons and problems among the loops. The operator can also move from display 220 or display 222 to a common supporting processes display 224 which will provide advice about the subordinated processes which are common to all of the loops. The operator can also move to various loop 1 detail displays which will provide advice pertinent to issues (requirements) and components at a very detailed level of loop 1. To facilitate movement among the functionally related hierarchial displays illustrated in FIG. 6, a miniature of the display organization can be provided in a portion 230 of the display 26, as illustrated in FIG. 4. The current display would be highlight-ed and the adjacent displays in the hierarchy would be shown. In such a display 230 the name of the adjacent displays should be provided in the boxes representing the displays and a method such light pen or mouse actuation should be provided for selecting the displays.

The present invention has been described with respect to a preferred embodiment that uses a forward chaining rule based expert system, however, the present invention could be used with other types of expert systems. The expert graphic display of the ranges of the present invention as previously described do not represent the temporal ordering of the action script. That is, the ranges do not indicate which controllable parameter should be changed first. However, it is possible to provide a limited version of temporal ordering by for example blinking the range graphic and parameter value indicators to represent which parameter needs to be changed first in accordance with the first step of the action script.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling within the scope of the invention.

What is claimed is:

1. A display system for a nuclear power plant, comprising:
   an expert system for providing expert advice; and
   a display comprising:
      a dynamic range graphic representing the expert advice concerning a parameter of a process of the nuclear power plant;
      an actual value indicator positioned adjacent said dynamic range graphic and indicating an actual value of the parameter;
      an alarm message in association with said dynamic range graphic;
      a prediction graphic adjacent to said actual value indicator graphically depicting a prediction for the parameter;
      a parameter history graphic adjacent to said dynamic range graphic graphically depicting historic values of the parameter; and
      an action recommendation message in association with said dynamic range graphic temporally ordering the expert advice.

2. An apparatus for providing expert advice in a nuclear power plant, comprising:
   expert system advice means for producing expert system advice as dynamic range values for a parameter and a recommended action providing temporal ordering of the expert advice for changing a parameter value;
   state prediction means for producing a prediction of future values of the parameter;
   alarm management means for producing an alarm message when an actual value of a parameter is outside a range of the range values, producing a threshold prediction message when one of the future values exceeds a predetermined threshold and producing an out of range prediction message when one of the future values is outside the range; and
   display processing means for providing a display graphically representing the dynamic range values visually adjacent to the actual value, graphically presenting the prediction, graphically presenting a history of the actual value and displaying the alarm and predication messages.

3. A method of producing an expert advice display for a nuclear power plant, comprising the steps of:
   (a) producing, using an expert system, expert advice as dynamic range values defining a range of operation for a parameter and an action recommendation temporally ordering the expert advice for changing the parameter;
   (b) producing an alarm message when an actual value of the parameter is outside the range;
   (c) producing a prediction of future values of the parameter;
   (d) comparing the prediction to a threshold and producing a threshold crossing prediction message when the prediction crosses the threshold;
   (e) comparing the prediction to the range and producing an out of range prediction when the prediction is outside the range;
   (f) producing a history of parameter values; and
   (g) graphically displaying in visual association the actual value, the range, the prediction, the history, the alarm and prediction messages and the action recommendation.

* * * * *